Patented Dec. 19, 1950

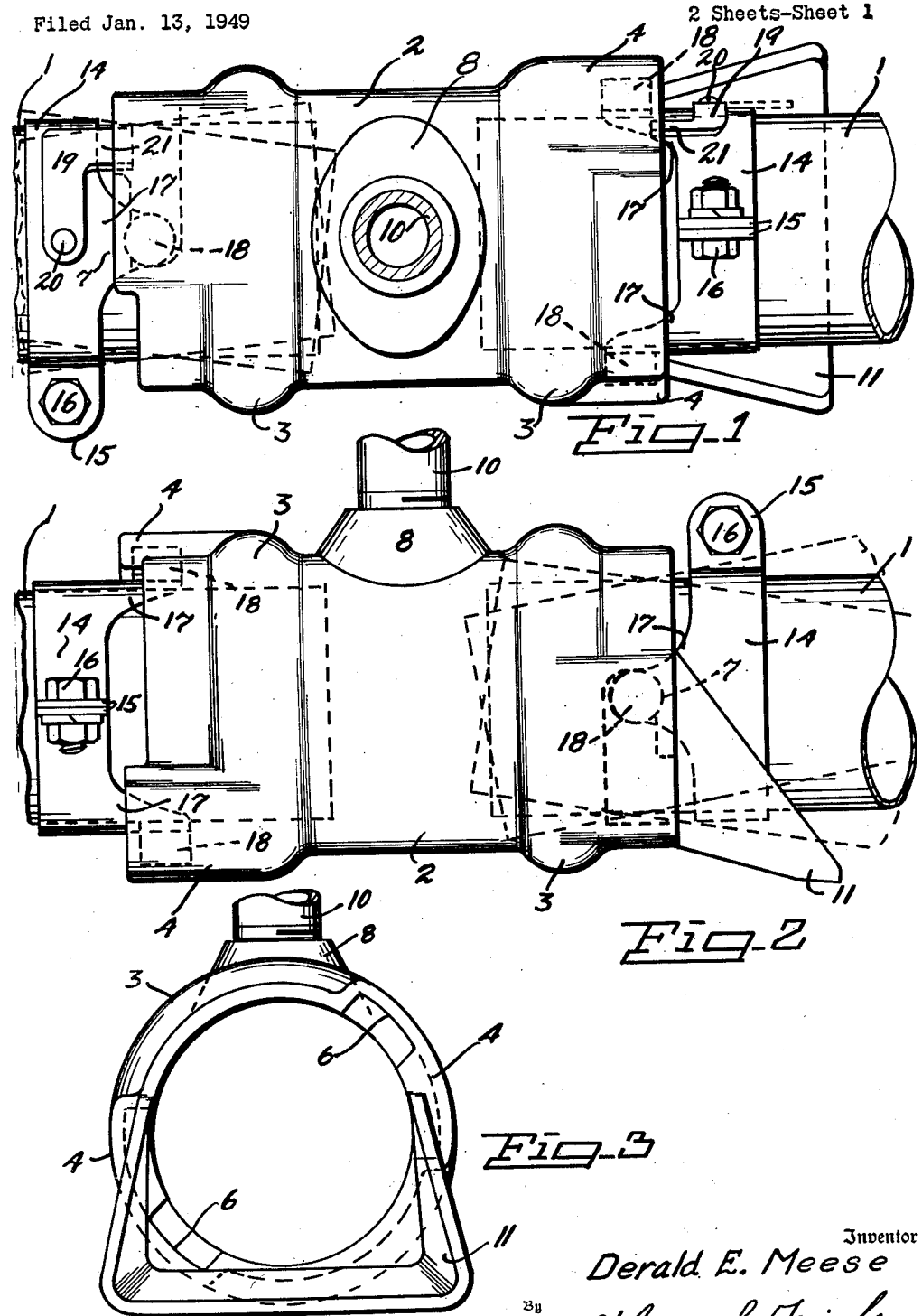

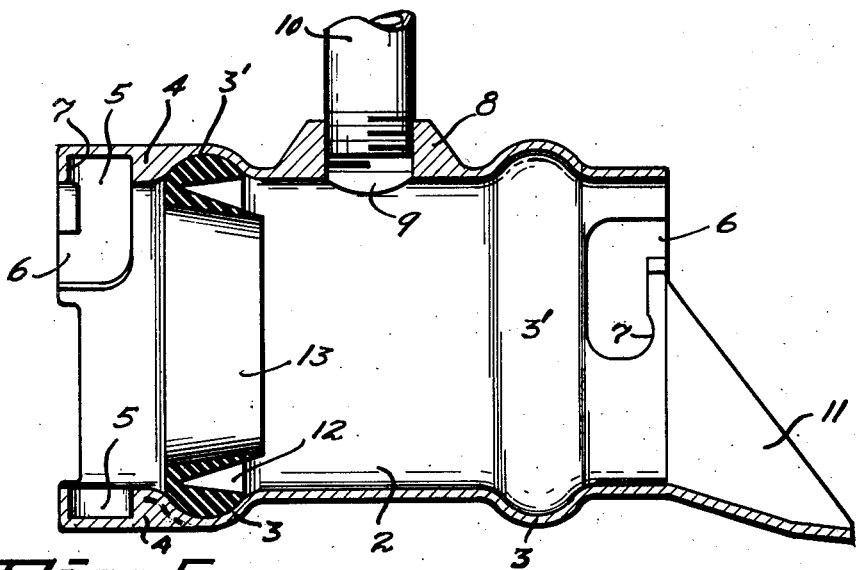
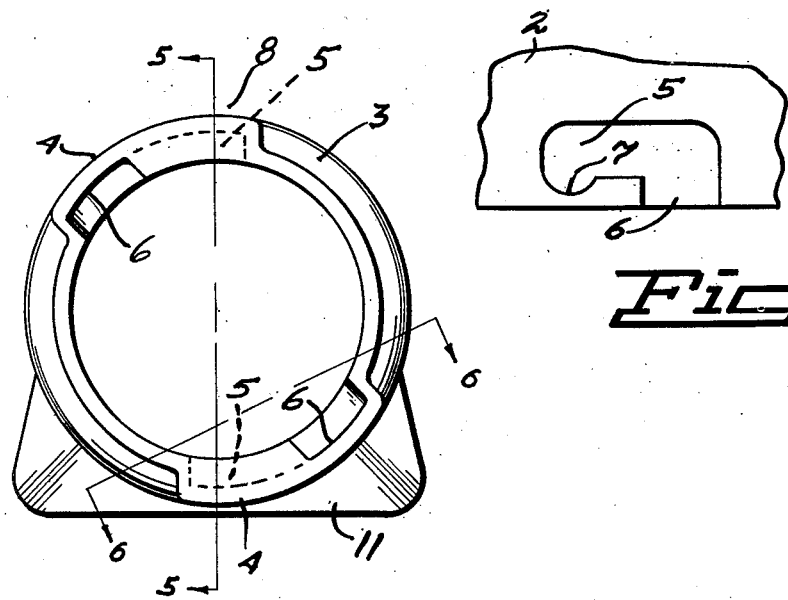

2,534,723

UNITED STATES PATENT OFFICE 2,534,723

PIPE COUPLING

Derald E. Meese, Spokane, Wash., assignor of twenty-five per cent to Joseph W. Duprie, twenty-five per cent to Elmer H. Gendron, and twenty-five per cent to Jerome J. Eiben, all of Spokane, Wash.

Application January 13, 1949, Serial No. 70,711

1 Claim. (Cl. 285—172)

This invention relates to pipe couplings and more particularly to a pipe coupling used for connecting pipe sections of an irrigation system, it being one object of the invention to provide a coupling of such construction that pipe sections extending at an angle out of axial alinement with each other may be connected by a coupling disposed horizontally and the coupling disposed horizontally between connected ends of the pipe sections. It will thus be seen that since the couplings for a series of pipe sections are disposed horizontally stand pipes rising from the couplings may be disposed in a truly vertical position and water discharged from nozzles at upper ends of the stand pipes in an effective manner for watering plants growing in a field in which the irrigation system is installed.

Another object of the invention is to provide a coupling of such construction that tightly sealed joints will be formed between the pipe sections and end portions of the coupling into which the pipes fit and thus prevent leakage between the couplings and the pipe sections.

Another object of the invention is to provide a coupling including clamps which are secured about end portions of pipe sections to be connected and carry lugs or pins which engage in bayonet slots formed in end portions of the coupling, the coupling being provided at one end with a shoe which rests upon the ground and prevents the coupling from turning to a position which would allow the lugs to become dislodged from the bayonet slots.

Another object of the invention is to provide a coupling having in its end portions sealing rings or gaskets of such formation that portions which fit snugly about the pipe sections may have tilting movement to portions which are seated in annular recesses formed within the coupling and thus allow the gaskets to accommodate themselves to the angular relation of the pipe sections to the coupling.

Another object of the invention is to provide a pipe coupling which is simple in construction, easy to apply, and not liable to work loose from pipe sections connected by the coupling.

The invention is illustrated in the accompanying drawings wherein:

Fig. 1 is a top plan view of the improved coupling.

Fig. 2 is a side elevation thereof.

Fig. 3 is a view looking at one end of the pipe coupling.

Fig. 4 is a view looking at the other end of the pipe coupling.

Fig. 5 is a sectional view taken longitudinally through the pipe coupling, the view being along the line 5—5 of Figure 4.

Fig. 6 is a fragmentary view taken along the line 6—6 of Figure 4.

This improved coupling is primarily intended for connecting adjoining ends of pipe sections 1 forming portions of a pipe line of an irrigation system but it is to be understood that the coupling may be used for connecting pipes forming portions of any pipe line. The pipe sections of an irrigation system do not all extend in axial alinement with each other and the improved coupling is therefore so formed that it may accommodate itself to the angular relation of the pipes 1 to each other and still be in a horizontal position.

The coupling has a body or shell 2 which is of tubular formation and open at both ends. Near its opposite ends the body is formed with circumferentially extending concavo-convexed portions 3 defining internal recesses or seats 3' and between these seats and ends of the body are circumferentially spaced thickened portions 4 in which are formed bayonet slots 5 having entrances 6 at their outer ends and at their inner ends being formed with depressions or seats 7 projecting towards ends of the body. Midway its length the body is formed with an upstanding boss 8 through which is formed a threaded opening 9 to receive the threaded lower end of a stand pipe 10. The stand pipe may be of any length desired and at its upper end carry a nozzle (not shown) from which water is to be discharged onto ground to be watered when the irrigation system is in operation. One end of the tubular body carries a shoe 11 which projects from the lower portion of the body and has a flat bottom and upstanding side walls which taper towards the body. Since the shoe has a flat bottom which rests upon the ground the body will be prevented from having turning movement and the stand pipe will be maintained in a vertical position and prevented from being tilted transversely of the body out of the vertical position. While a shoe has been shown at only one end of the body it will be understood that a similar shoe may be provided at the other end of the body. Bracing the body against turning movement also prevents accidental dislodgment of the pipes 1 from the coupling, as will be hereinafter brought out.

When the pipes are thrust into the end portions of the coupling a tight seal must be provided about the pipes. In order to do so there have been provided sealing rings or gaskets 12, one of which has been shown in Figure 5. These rings or gaskets are thrust into the end portions of the body and seated in the recesses 3' and since outer surfaces of the rings are arcuate transversely they fit snugly in the recesses and will not slip out of the recesses. This also permits the rings to tilt and when the rings are worn out they may be easily removed and new ones applied. Each ring has integrally formed therewith a sleeve 13 which is concentric with the ring and extends from the outer side of the ring and beyond the inner side thereof. The sleeve is externally gradually reduced in thickness from its outer end towards its inner end thus forming the sleeve with tapered walls but causing it to be of an even internal diameter throughout its length. The internal diameter of the sleeves of the rings or gaskets is such that when the pipes are thrust into the ends of the coupling body the sleeves fit tightly about the pipes and since each sleeve is attached to the ring only at its outer end the sleeves may have universal tilting movement and the pipes may be disposed in axial alinement with the coupling or diagonally thereof, as indicated by the dotted lines in Figure 2.

The pipes are to be locked in end portions of the coupler body and in order to do so a collar 14 is mounted about each pipe. The collars are of duplicate construction and each is formed from sheet metal and has the form of a clamping band which has its ends bent to provide ears 15. Bolts 16 are passed through the ears of the clamps and when the bolts are tightened the clamps or collars will be contracted and held in tight gripping engagement with the pipes. Arms 17 extend from outer sides of the collars and carry studs or pins 18 which are circular in cross section and of such diameter that the pins may be thrust into the bayonet slots through the entrances 6 thereof and the pipes then turned to move the pins along the bayonet slots until they come to rest in the seats 7. The pipes fit snugly in the sleeves of the sealing rings 12 since the pins are circular in cross section the pipes and the coupling may have rocking or tilting movement relative to each other and the pipes thus allowed to follow the contour of the surface of the ground upon which they rest or the bottom of a ditch in which a pipe line of an irrigation system is laid. It should also be noted that the bayonet slots at one end of the coupling are offset circumferentially of the body 90° relative to the bayonet slots at the other end of the coupling. It is therefore necessary to so apply the collars or clamps 14 to the pipes that the pins 18 of one collar are at right angles to the pins of the collar upon the other end of the pipe. Since the pins of the collar thrust into one end of the coupling are at right angles to the pins of the collar thrust into the other end of the pipe a universal tilting movement of the connected pipes is permitted and the pipe line can be laid with its pipe sections extending diagonally of each other. As the shoes of the couplings rest flat upon the ground the couplings will be prevented from having turning movement and they can not turn to a position in which the pins will move along the bayonet slots and outwardly through the entrance thereof. As additional means for preventing turning of the pipes and the couplings relative to each other each collar or clamp 14 carries a latch 19 which is pivotally mounted by a pin 20 and has a laterally extending bill 21. When the latches are swung about their pins to a securing position their bills enter entrances of bayonet slots in the coupling and the pipes or the couplings can not be turned until the latches are swung to the releasing position.

Having thus described the invention, what is claimed is:

A pipe coupling comprising a cylindrical body open at opposite ends, and portions of the body being formed internally with circumferentially extending recesses, portions of the body between the recesses and its ends being formed with bayonet slots leading from the said ends of the body and extending circumferentially of the body, elastic sealing rings in the body seated in said recesses, collars adapted to be tightly secured about end portions of pipes and provided with arms extending into the body and carrying side pins engaging in the bayonet slots and holding pipes against outward movement when thrust into the body and through the sealing rings, and latches carried by said collars and movable into and out of position to fit into entrance ends of the bayonet slots.

DERALD E. MEESE.

REFERENCES CITED

The following references are of record in the file of this patent:

UNITED STATES PATENTS

| Number | Name | Date |
|---|---|---|
| 2,464,466 | Stout | Mar. 15, 1949 |
| 2,469,538 | Young | May 10, 1949 |
| 2,470,539 | Wyss | May 17, 1949 |